US012471682B2

(12) United States Patent
Mueller et al.

(10) Patent No.: US 12,471,682 B2
(45) Date of Patent: Nov. 18, 2025

(54) PORTABLE OBJECT COMPRISING A CASE, A REMOVABLE BRACELET AND A SYSTEM FOR ATTACHING THE BRACELET TO THE CASE

(71) Applicant: ETA SA Manufacture Horlogère Suisse, Grenchen (CH)

(72) Inventors: Roger Mueller, Kirchberg (CH); Dohan Schlichtig, Olten (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 551 days.

(21) Appl. No.: 17/823,178

(22) Filed: Aug. 30, 2022

(65) Prior Publication Data

US 2023/0189943 A1 Jun. 22, 2023

(30) Foreign Application Priority Data

Dec. 20, 2021 (EP) .................................... 21216079

(51) Int. Cl.
*A44C 5/14* (2006.01)
*G04B 37/14* (2006.01)

(52) U.S. Cl.
CPC .......... *A44C 5/147* (2013.01); *G04B 37/1486* (2013.01)

(58) Field of Classification Search
CPC ......... A44C 5/14; A44C 5/147; A44C 5/0053; A44C 5/00; A44B 11/2596; A44B 11/2592; G04B 37/1486
See application file for complete search history.

(56) References Cited

U.S. PATENT DOCUMENTS 4,432,655 A * 2/1984 Wollman ........... G04B 37/1486 368/282
4,664,533 A * 5/1987 Wollman ........... G04B 37/1486 368/282

(Continued)

FOREIGN PATENT DOCUMENTS

CN 106539207 A 3/2017
JP 6-82590 U 11/1994

(Continued)

OTHER PUBLICATIONS

European Search Report Issued May 25, 2022 in European Application 21216079.0 Filed on Dec. 20, 2021 (with English Translation of Categories of Cited Documents), 4 pages.

(Continued)

*Primary Examiner* — Jason W San
*Assistant Examiner* — Louis A Mercado
(74) *Attorney, Agent, or Firm* — Oblon, McClelland, Maier & Neustadt, L.L.P.

(57) ABSTRACT

A portable object includes a case having a middle, a bracelet, and an attachment system for removably securing each end of the bracelet to the middle. The middle includes two longitudinal cavities to form a slide bar. Each end of the bracelet includes a fastening head that cooperates, by sliding, with one of the longitudinal cavities to form the attachment system. The fastening head includes an end flange made of a viscoelastic material. The attachment system includes a viscoelastic fitting for locking axial movement of the fastening head inside the longitudinal cavity by the viscoelastic response of the end flange. The viscoelastic fitting is formed by cooperation of a rigid locking protrusion in each longitudinal cavity to deform the end flange upon insertion of the bracelet. The locking protrusion fits inside a (Continued)

recess made in the end flange to lock the axial movement of the fastening head.

16 Claims, 3 Drawing Sheets

(56) References Cited

U.S. PATENT DOCUMENTS

| | | | | |
|---|---|---|---|---|
| 9,357,817 | B2 * | 6/2016 | Lee | A44C 5/14 |
| 10,123,593 | B2 * | 11/2018 | Perkins | A44C 5/2085 |
| 10,184,506 | B2 * | 1/2019 | Chen | G04B 37/1486 |
| 10,327,520 | B1 * | 6/2019 | Ely | G04B 47/046 |
| 10,418,693 | B2 * | 9/2019 | Xu | A44C 5/0053 |
| 11,241,068 | B2 * | 2/2022 | Lui | G04B 37/0008 |
| 11,611,372 | B1 * | 3/2023 | Hiemstra | A44C 5/0007 |
| 11,803,162 | B2 * | 10/2023 | Pandya | G04G 17/04 |
| 11,903,459 | B2 * | 2/2024 | Schlichtig | A44B 11/2596 |
| 2016/0037876 | A1 | 2/2016 | Perkins et al. | |
| 2016/0037877 | A1 | 2/2016 | Perkins et al. | |
| 2018/0125178 | A1 | 5/2018 | Perkins et al. | |
| 2019/0053584 | A1 | 2/2019 | Perkins et al. | |
| 2019/0110561 | A1 | 4/2019 | Perkins et al. | |
| 2019/0358898 | A1 | 11/2019 | Kaltenrieder et al. | |
| 2020/0019121 | A1 * | 1/2020 | Han | A44C 5/14 |
| 2020/0323315 | A1 | 10/2020 | Lui et al. | |
| 2021/0161258 | A1 | 6/2021 | Perkins et al. | |
| 2021/0353226 | A1 * | 11/2021 | Hiemstra | G06F 1/163 |

FOREIGN PATENT DOCUMENTS

| | | | |
|---|---|---|---|
| JP | 2000-253913 | A | 9/2000 |
| JP | 2001-112517 | A | 4/2001 |
| JP | 2019-207225 | A | 12/2019 |
| WO | WO 2016/016832 | A2 | 2/2016 |

OTHER PUBLICATIONS

Office Action issued Sep. 12, 2023, in corresponding Japanese Patent Application No. 2022-142729 (with English Translation), 10 pages.
Office Action issued Apr. 2, 2024, in corresponding Japanese Patent Application No. 2022-142729 (with English Translation), 12 pages.
Office Action issued May 2, 2024, in corresponding Korean Patent Application No. 10-2022-0128111 (with English Translation), 11 pages.

* cited by examiner

PORTABLE OBJECT COMPRISING A CASE, A REMOVABLE BRACELET AND A SYSTEM FOR ATTACHING THE BRACELET TO THE CASE

CROSS-REFERENCE TO RELATED APPLICATION

The present application claims priority to European Patent Application No. 21216079.0, filed on Dec. 20, 2021, the entire content and disclosure of which are incorporated by reference herein.

TECHNICAL FIELD OF THE INVENTION

The present invention relates to a portable object comprising a case and a bracelet connected to the case, intended to be worn on the user's wrist. The invention relates more particularly to a device for removably attaching the bracelet to the case of the portable object, allowing the bracelet to be assembled and removed without the use of tools.

The invention more particularly relates to a wristwatch comprising a watch case and a bracelet connected to said watch case, via a device for removably attaching the bracelet to the watch case.

TECHNOLOGICAL BACKGROUND

The attachment devices used to attach a bracelet to a watch case are typically quite complex, in terms of the number of different parts required for assembly, the complexity of these parts and the difficulty in manufacturing them.

In particular, the ends of each strand of the bracelet and the watch case must be specially shaped and machined in order to fit together. Moreover, the assembly of these various elements is quite long and thus costly.

The usual attachment devices are based on the presence of two horns, or other projecting elements, provided on the perimeter of the middle of the watch case, and a cross bar inserted at the end of a bracelet strand, each end of the cross bar being inserted into a hole made in each horn.

This type of attachment for attaching a bracelet to a watch case requires a specific tool to be used for bracelet interchangeability. As a result, if the user wants to change his/her bracelet due to wear and tear or for aesthetic purposes, he/she must typically ask a professional to carry out this replacement. This takes time and is carried out at a certain cost.

From an industrial point of view, the horns or other elements projecting from the periphery of the middle prevent many operations from being automated during the manufacture of the watch case or during the finishing process. Some operations must thus be carried out manually to avoid damaging the horns or other projecting elements.

Attachment devices facilitating the interchangeability of bracelets are known. However, these attachment devices are typically complex to produce and require the use of spacers between the bracelet strand and the watch case in order to lock the bracelet, such as springs or blades, etc.

Moreover, attachment devices that offer simplified bracelet interchangeability require extensive modifications to the watch case and/or bracelet without facilitating the method for manufacturing these elements, thus resulting in additional costs during manufacture.

As a result, there is a need to improve devices for removably attaching a bracelet to a watch case, and more generally a bracelet to a portable object, in order to overcome at least one of the known limitations described hereinabove.

SUMMARY OF THE INVENTION

In this context, the purpose of the invention is to propose a device for removably attaching a bracelet to a case of a portable object that is simple in design, inexpensive, and that does not require any additional parts between the bracelet and the case of the portable object to ensure elastic coupling and locking. Thus, the invention offers a "one-piece" solution that does not require the use of additional parts in order to fit and lock the bracelet in position on the case.

The invention further aims to provide an attachment device that allows the bracelet to be assembled on and removed from the case without the use of tools. The user can thus easily change his/her bracelet in the event of wear and tear, or to change the aesthetics thereof, without contacting a professional.

The invention further aims to provide an attachment device that allows the parts to be manufactured easily, so that the bracelet and case can be fully automated by conventional means of producing and without requiring manual reworking of the attachment device.

The attachment device according to the invention provides a case whose middle is devoid of horns and of projecting elements for assembling the bracelet, which makes it possible to procure a symmetrical case whose production can be easily automated.

To this end, the invention relates to a portable object comprising a case having a middle, a bracelet, and an attachment system for removably securing each end of said bracelet to the middle, the middle comprising two longitudinal cavities configured to form a slide bar, each end of the bracelet comprising a fastening head, that has a complementary shape of longitudinal cavities, and that is configured to cooperate, by sliding, with one of the longitudinal cavities to form the attachment system, said portable object being characterised in that said fastening head comprises a portion made of a viscoelastic material, and in that the attachment system comprises viscoelastic fitting means for locking the axial movement of said fastening head inside the longitudinal cavity by the viscoelastic response of the portion, the viscoelastic fitting means being formed by the cooperation of a rigid locking protrusion, provided in each of the longitudinal cavities, and configured to deform the portion (made of a viscoelastic material) upon insertion of the bracelet, said locking protrusion being configured to fit inside a recess made in the portion made of a viscoelastic material in order to lock the axial movement of the fastening head.

In addition to the features mentioned in the preceding paragraph, the portable object according to the invention can have one or more complementary features from among the following, considered either on an individual basis or according to any combination technically possible:

- the portion made of a viscoelastic material is an end portion of the fastening head;
- the portion made of a viscoelastic material forms an end flange;
- the portion made of a viscoelastic material is made of a thermoplastic elastomer;
- the fastening head at each end of the bracelet is made of a thermoplastic elastomer;

- the recess is made in a central region of the portion made of a viscoelastic material and the locking protrusion is longitudinally centred inside the longitudinal cavity;
- the bracelet has two strands, each strand comprising a fastening head forming the end of the strand, and the fastening head being formed integrally in one piece with the strand of the bracelet;
- the locking protrusion is formed integrally in one piece with the middle;
- the middle is made of a thermoplastic material, preferably polyamide 11;
- the dimensions of the fastening head are greater than the dimensions of the longitudinal cavity; thus, the portion made of a viscoelastic material must undergo an additional deformation when the fastening head is being inserted into the longitudinal cavity;
- the attachment system is configured to allow the bracelet to be assembled and removed either via a first end or via a second end of the longitudinal cavity;
- the longitudinal cavities extend over two circular segments of the middle located in the 6 o'clock and 12 o'clock positions of the case.

Advantageously, the portable object is a wristwatch.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

Figure 1:
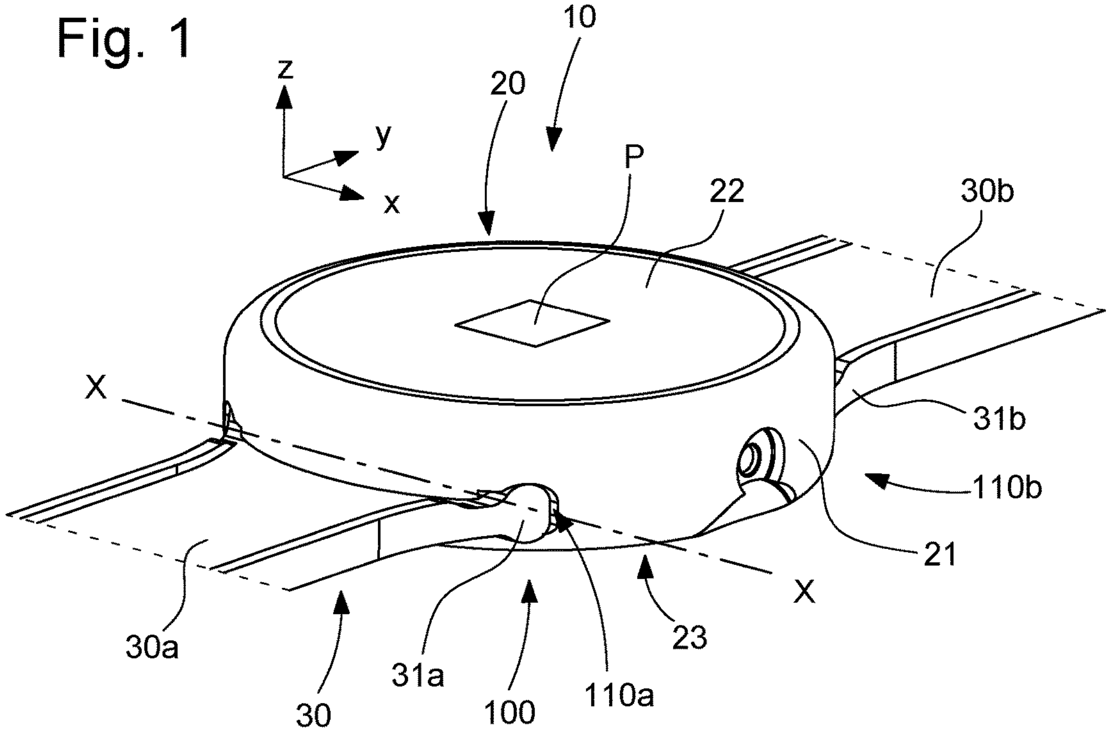
FIG. 1 shows a first perspective view of an example embodiment of a portable object according to the invention.

FIG. 1 shows a first perspective view of an example embodiment of a portable object 10 according to the invention. In this instance, this portable object 10 takes the form of a timepiece, such as a wristwatch, intended to be worn on the user's wrist. It will also be understood that the portable object 10 can be, for example, a pedometer, a heart rate monitor, or any other portable object intended to be worn via a bracelet, for example on the wrist.

Figure 2:
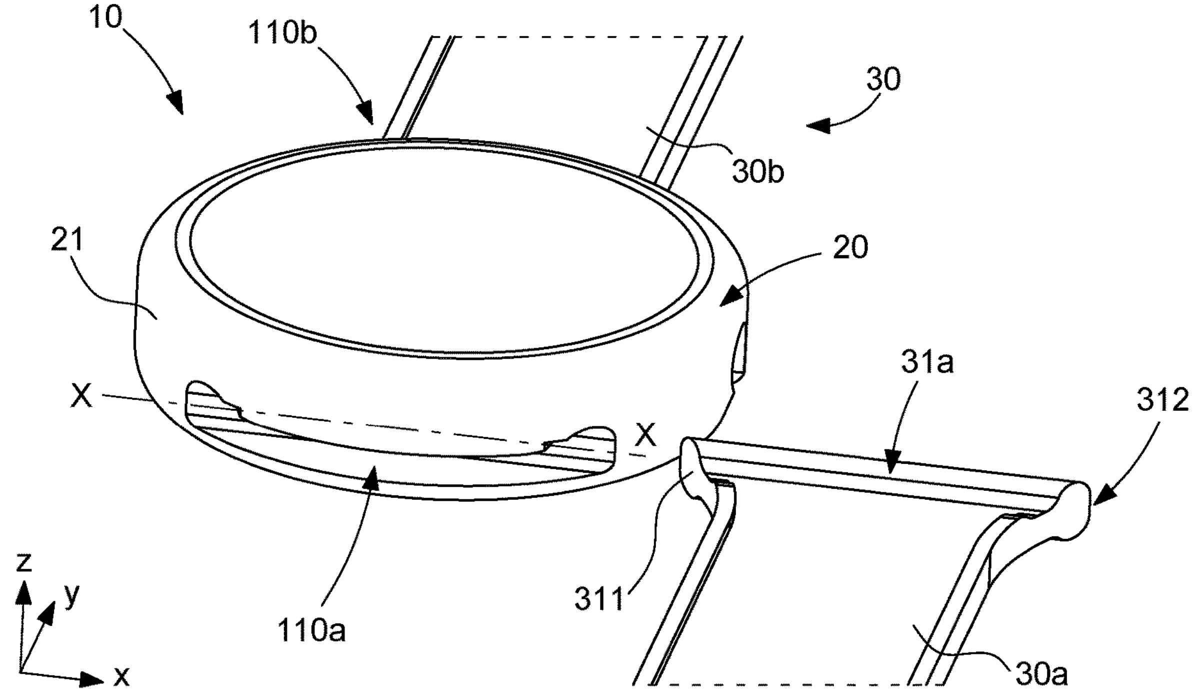
FIG. 2 shows a second perspective view of the example embodiment of the portable object according to the invention, in which is shown a bracelet strand that is not fitted into the middle.

FIG. 2 shows a second perspective view of the example embodiment of the portable object 10 according to the invention, in which is shown a bracelet strand that is not fitted into the middle.

The portable object 10 comprises a case 20, intended to receive a horological movement for example (not shown here for clarity reasons). The horological movement carries and drives means for displaying information, for example the current time.

The case 20 consists of a middle 21, the lower part whereof is closed by a back 23 and the upper part whereof is closed by a crystal 22. The case 20 can further comprise a bezel (not shown) assembled onto the middle 21 and capable of carrying the crystal 22, whereby the bezel may or may not be capable of rotating.

The case 20 defines a main plane P which is visible, for example, in FIG. 1, with the transverse axis x and longitudinal axis y. The z-axis extends perpendicularly to the plane P, and defines the axis through the thickness of the case 20. The plane P is advantageously parallel to the planar part of a plate comprised in the horological movement.

In the example embodiment shown, the transverse axis x is parallel to the 3 o'clock-9 o'clock time axis and the longitudinal axis y is parallel to the 6 o'clock-12 o'clock time axis.

The case 20 shown by way of example is circular in shape overall. However, the case 20 can have other known embodiments without leaving the scope of the invention.

The portable object 10 further comprises a flexible, removable bracelet 30, the two ends whereof are intended to be removably coupled to the middle 21 of the case 20, via an attachment system 100. The attachment system 100 allows the bracelet 30 to be secured to the case 20, to be locked in position, and to make it possible to easily interchange the bracelet 30 without using tools.

The attachment system 100 allows the bracelet 30 to be fitted, in a reversible manner, by viscoelastic deformation. As a result, the attachment system 100 according to the invention is particularly advantageous compared to a system with irreversible snap fitting, which requires the destruction or deterioration of at least one of the elements constituting the attachment system when the bracelet 30 is removed from the case 20.

The attachment system 100 according to the invention is an alternative embodiment of a snap fitting type of attachment system. Such an attachment system by viscoelastic deformation in particular simplifies the production of such an attachment system in particular by using the viscoelastic deformation properties of the bracelet. This makes the bracelet 30 easier to design and manufacture.

The bracelet 30 takes on the form of two strands 30*a*, 30*b* connected to one another by a fastening device (not shown), for example a clasp, a folding buckle or any other ad-hoc element procuring this function of attaching the two strands 30*a*, 30*b* of the bracelet 30 around the user's wrist.)

According to an alternative embodiment, the bracelet 30 can be formed by a single strand.

The middle 21 comprises two longitudinal cavities 110*a*, 110*b* configured to receive the end of each strand 30*a*, 30*b* of the bracelet 30, and more particularly of the fastening heads 31*a*, 31*b* forming the ends of each strand 30*a*, 30*b* of the bracelet 30. A first longitudinal cavity 110*a* is shown more particularly in FIG. 2.

The longitudinal cavities 110*a*, 110*b* are made in the middle 21 and advantageously replace the attachment horns commonly used to fasten the bracelet 30. The longitudinal cavities 110*a*, 110*b* cooperate with the fastening heads 31*a*, 31*b* of the strands 30*a*, 30*b* of the bracelet 30 to form the attachment system 100 of the bracelet 30.

Thus, it can be seen that the middle 21 of the case 20 according to the invention does not comprise any projecting element for attaching the bracelet 30. As a result, the manufacture of the case 20 can be fully automated.

The longitudinal cavities 110*a*, 110*b* are made in two attachment portions, opposite one another, located on either side of a dial (not shown), and advantageously located at 6 o'clock and 12 o'clock.

The longitudinal cavities 110*a*, 110*b* extend over two circular segments of the middle 21 located in the 6 o'clock and 12 o'clock positions.

The longitudinal cavities 110*a*, 110*b* form slide bars extending along a longitudinal axis forming a sliding axis X-X, parallel to the transverse axis x of the case 20.

The longitudinal cavities 110*a*, 110*b* are configured to receive the fastening heads 31*a*, 31*b* of the strands 30*a*, 30*b* of the bracelet 30 and to guide the fastening heads 31*a*, 31*b* in translation along the sliding axis X-X when the bracelet 30 is being assembled or removed.

Thus, the strands 30*a*, 30*b* are assembled on the middle 21 by sliding the fastening heads 31*a*, 31*b* into the longitudinal cavities 110*a*, 110*b* of the middle 21.

The longitudinal cavities 110*a*, 110*b* are open-ended, i.e. they are open at a first end and at a second end, so that the bracelet 30 can be inserted and removed by sliding both through the first end and through the second end of the longitudinal cavities 110*a*, 110*b*, i.e. through the end located on the same side as the crown (3 o'clock side) or through the end located on the side opposite the crown (9 o'clock side).

The fastening heads 31*a*, 31*b* of the strands 30*a*, 30*b* have a complementary shape and are adapted to be housed inside the longitudinal cavities 110*a*, 110*b* and to cooperate by sliding in a rectilinear manner, along the sliding axis X-X, inside the longitudinal cavities 110*a*, 110*b*.

Figure 3:
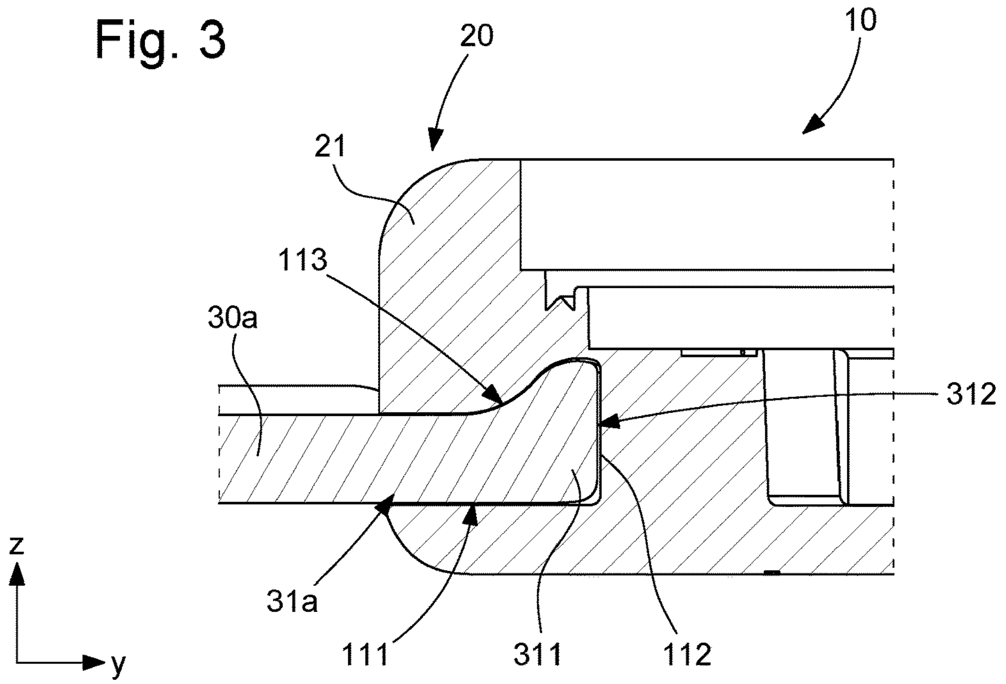
FIG. 3 shows a sectional view of the portable object in the y, z plane of the case, illustrating the cross-section of the longitudinal cavities and of the fastening heads locked inside the longitudinal cavities.

FIG. 3 shows a sectional view of a portion of the wristwatch 10 in the y, z plane illustrating the cross-section of the longitudinal cavities 110*a*, 110*b* and of the fastening heads 31*a*, 31*b* locked inside the longitudinal cavities 110*a*, 110*b*.

It can be seen that the longitudinal cavities 110*a*, 110*b* and the fastening heads 31*a*, 31*b* have a substantially hook-shaped cross-section.

The longitudinal cavities 110*a*, 110*b* have a lower surface 111 defining the lower portion of the cavity, a bottom 112 and an upper surface 113 defining the upper portion of the cavity.

Advantageously, the longitudinal cavities 110*a*, 110*b* have an undercut portion allowing the movements of the bracelet to be blocked except for those in which it moves in translation along the sliding axis X-X, corresponding to the longitudinal axis of the longitudinal cavities 110*a*, 110*b*.

In the example embodiment shown, an undercut portion is made in the upper surface 113 of the longitudinal cavity 110*a*, 110*b*, the lower surface 111 being planar.

In an alternative embodiment (not shown), an undercut portion can be made in the lower surface 111 of the longitudinal cavity 110*a*, 110*b*, the upper surface 113 being planar.

In an alternative embodiment (not shown), the lower surface 111 and the upper surface 113 of the longitudinal cavity 110*a*, 110*b* can have an undercut portion.

Each fastening head 31*a*, 31*b* has an end flange 311 forming the free end of the fastening head 31*a*, 31*b*, the end flange 311 having an end surface 312 intended to be positioned facing or in contact with the bottom 112 of the longitudinal cavity 110*a*, 110*b*.

The end flange 311 has an excess thickness of material compared to the strand 30*a*, 30*b* of the bracelet 30.

Such a form advantageously makes it possible to allow the strand 30*a*, 30*b* to move in translation inside the corresponding longitudinal cavity 110*a*, 110*b* by sliding along the axis X-X, while blocking the other degrees of freedom by the presence of the end flange 311 of material at the end of the fastening head 31*a*, 31*b* forming an excess thickness of material with respect to the strand 30*a*, 30*b*. The flange 311 is shaped to cooperate with the undercut portion of the longitudinal cavity 110*a*, 110*b* and to form means for holding the bracelet 30.

It goes without saying that other embodiments can also be envisaged. For example, the longitudinal cavities 110*a*, 110*b* and the complementary fastening heads can have a circular, L-shaped, T-shaped, or C-shaped section, etc.

The attachment system 100 further comprises viscoelastic fitting means for securing and locking the axial movement of each strand 30*a*, 30*b* inside the longitudinal cavities 110*a*, 110*b* of the middle 21, to lock the position of each strand 30*a*, 30*b* in a so-called locking position.

The viscoelastic fitting means are configured to procure a reversible viscoelastic fitting of the fastening heads 31*a*, 31*b* of the strands 30*a*, 30*b* on the middle 21, by viscoelastic deformation of the fastening heads 31*a*, 31*b*, and more particularly of the end flanges 311.

To this end, at least the end flanges 311 of the fastening heads 31*a*, 31*b* are made of a material that allows for viscoelastic deformation when the strands 30*a*, 30*b* are inserted into the case 20.

The viscoelastic fitting means comprise a locking protrusion 210, such as a stud or finger. Advantageously, the locking protrusion 210 is centred longitudinally in each longitudinal cavity 110*a*, 110*b*, relative to the sliding axis X-X. However, other positions of the locking protrusion 210 can also be envisaged.

Figure 4:
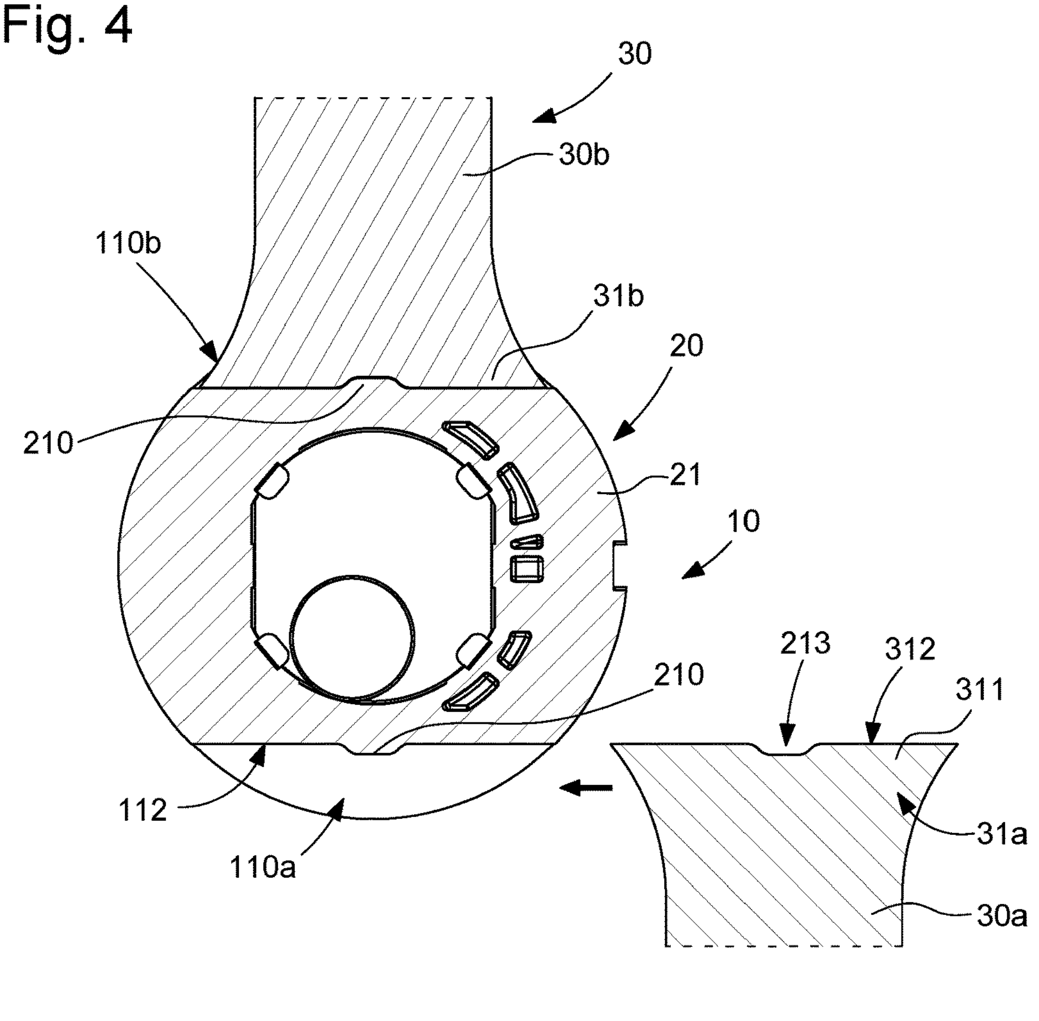
FIGS. 4 to 6 show the various stages of assembling the bracelet onto the middle of the portable object according to the invention.

FIG. 4 shows a sectional view of the portable object 10 illustrated in FIG. 2 along a median plane of the case parallel to a plane x, y, illustrating the median section of the longitudinal cavities 110*a*, 110*b* and of the fastening heads 31*a*, 31*b*, and in particular the locking protrusion 210 provided inside the longitudinal cavities 110*a*, 110*b*.

The locking protrusion 210 is made at the bottom 112 of the longitudinal cavity 110*a*, 110*b*, and projects from the bottom 112, so as to form an obstacle preventing assembly of the strands 30*a*, 30*b* of the bracelet 30.

Advantageously, the locking protrusion 210 is rigid.

Advantageously, the locking protrusion 210 is formed integrally in one piece with the middle 21.

The locking protrusion 210 is configured to cooperate with the end surface 312 of the end flange 311 of the fastening heads 31*a*, 31*b*, and to viscoelastically deform the end flange 311 when the bracelet 30 is being assembled. Thus, in order to assemble the bracelet 30, the user must counter a certain assembly resistance due to the forces required to ensure that the viscoelastic deformation of the end flange 311 is sufficient to ensure passage of the locking protrusion 210 when the bracelet 30 is being inserted into the longitudinal cavity 110*a*, 110*b*.

A recess 213 is made at the end surface 312 of the flange 311 of the fastening heads 31*a*, 31*b*. The recess 213 is configured to receive the locking protrusion 210 and to form a blocking means for blocking the axial movement of the strand 30*a*, 30*b* inside the longitudinal cavity 110*a*, 110*b*. The recess 213 has a shape that is complementary to the shape of the locking protrusion 210.

The locking protrusion 210 cooperates with the recess 213 to form the viscoelastic fitting means of the bracelet 30 and to lock the axial movement of the fastening head 31*a*, 31*b*. In order to remove the bracelet 30, the user must generate sufficient force to remove the locking protrusion 210 from the recess 213 and to deform the end flange 311 of the fastening heads 31*a*, 31*b* again.

Advantageously, the locking protrusion 210 and the complementary recess 213 have relief angles or curvilinear shapes at the contact surfaces to facilitate the assembly and removal of the bracelet 30.

The viscoelastic fitting means according to the invention are configured to deform the end flanges 311 of the fastening heads 31*a*, 31*b* by compressing the material towards the bracelet 30, and more particularly the strands 30*a*, 30*b*, substantially along the longitudinal axis y of the case 20.

The fastening heads 31*a*, 31*b* of each strand 30*a*, 30*b* of the bracelet 30 are made of a more flexible material than the middle 21 of the case 20 so as to allow for the deformation of the end flanges 311 of the fastening heads 31*a*, 31*b* when the bracelet 30 is being assembled.

Advantageously, at least the end flange 311 of the fastening heads 31*a*, 31*b* of the bracelet 30 is made of a thermoplastic elastomer, of the TPV (ThermoPlastic Vulcanizate), TPU (thermoplastic polyurethane), TPE (thermoplastic elastomer) or TPO (thermoplastic polyolefin) type. By way of example, at least the end flange 311 of the fastening heads 31*a*, 31*b* can be made of Opti-Flex™.

By way of example, the fastening heads 31*a*, 31*b* of the bracelet 30 can be made of the same material or of a different material to the end flanges 311, with the same or different viscoelastic and hardness properties.

By way of example, the strands 30*a*, 30*b* can be made of the same material or of a different material to the fastening heads 31*a*, 31*b* of the bracelet 30, with the same or different viscoelastic and hardness properties.

By way of example, the middle 21 is made of a metal material or polymer. Advantageously, the middle 21 is made of a thermoplastic polymer. For example, the middle 21 can be made of polyamide 11, also referred to as polyundecanamide or nylon 11.

The middle 21 is advantageously a one-piece middle. However, a middle can also be assembled from a plurality of parts manufactured separately.

Advantageously, the polymer middle is a one-piece middle made by injection moulding.

Figure 5:
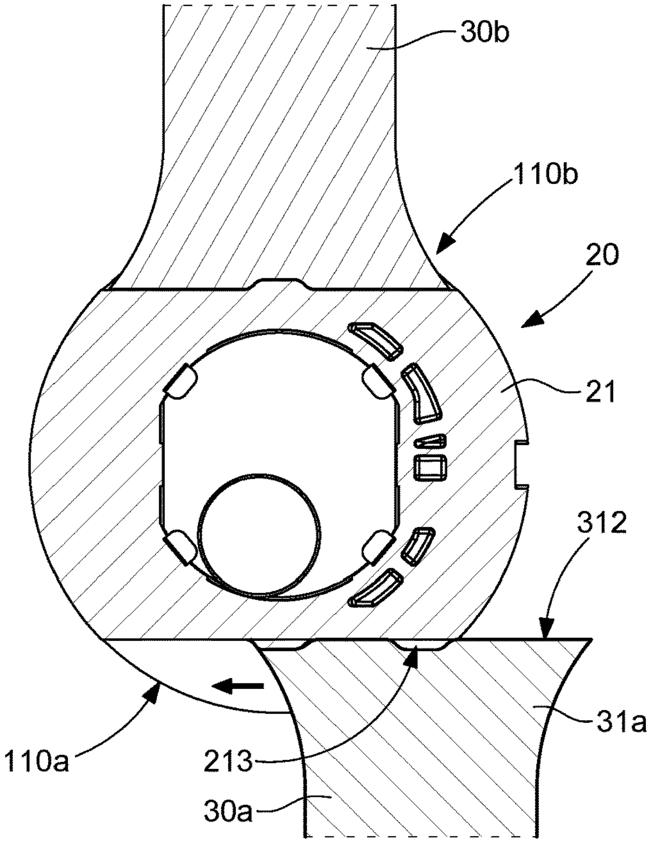
Figure 6:
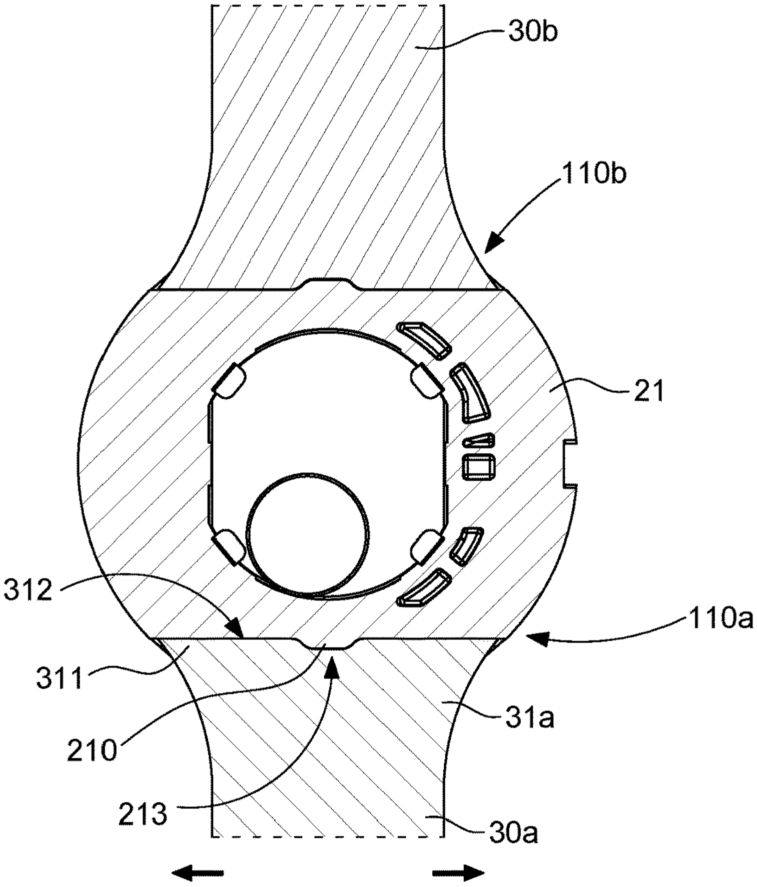

The bracelet 30 is assembled onto the middle 21 of the case 20 in the following manner. FIGS. 4 to 6 show different stages of the assembly process.

In a first stage, shown in FIG. 4, each strand 30*a*, 30*b* is inserted into a longitudinal cavity 110*a*, 110*b* in the middle 21.

As the longitudinal cavities 110*a*, 110*b* are symmetrical, the bracelet 30 can be assembled either via a first end or via a second end of the longitudinal cavities 110*a*, 110*b*, i.e. via the end located on the same side as the crown or via the opposite end thereto.

In a second stage shown in FIG. 5, each strand 30*a*, 30*b* is then slid into a longitudinal cavity 110*a*, 110*b* along the sliding axis X-X of the longitudinal cavity 110*a*, 110*b*, in the chosen assembly direction, for example in the direction shown in FIG. 5.

When inserting the strand 30*a*, 30*b*, and when the locking protrusion 210 comes into contact with a lateral end of the end flange 311, the user must assert force to viscoelastically deform the portion of the end flange 311 facing the locking protrusion 210, so as to allow the strand 30*a*, 30*b* to slide in the longitudinal cavity 110*a*, 110*b* until the locking protrusion 210 reaches the recess 213 in order to ensure that the bracelet 30 is locked by the viscoelastic response of the material at the flange 311, which recovers its initial shape.

Once the locking protrusion 210 is inserted into the recess, the bracelet 30 is then locked in position in the case 20. This third locking stage is shown in particular in FIG. 6.

In order to unlock and remove the bracelet 30, the user must assert sufficient force to remove the locking protrusion 210 from the recess 213 and to deform the end flange of the fastening heads 31*a*, 31*b* again, and in particular the portion of the end flange 311 facing the locking protrusion 210.

When the locking protrusion 210 is no longer in contact with the end flange 311 of the fastening heads 31*a*, 31*b*, the strand 30*a*, 30*b* can be slid freely and extracted from the longitudinal cavity 110*a*, 110*b*, by translating the strand 30*a*, 30*b* along the sliding axis X-X.

It should be noted that since the end flange 311 is made of a deformable material, the thickness of the end flange 311 and the hardness thereof must be determined so as to prevent the bracelet 30 from being extracted from the longitudinal cavity 110*a*, 110*b* by the user by exerting a tensile force on the bracelet 30 in the longitudinal direction of the case 20 by excessively deforming the end flange 311. Thus, with sufficient thickness, it will be ensured that the user cannot unbuckle the bracelet 30 by exerting a tensile force on the strands 30*a*, 30*b*.

According to an alternative embodiment, not shown, the fastening heads 31*a*, 31*b*, and more particularly the end flanges 311 have dimensions that are slightly greater than the dimensions of the longitudinal cavities 110*a*, 110*b*. This requires the fastening heads to undergo additional deformation when the strands 30*a*, 30*b* are being inserted. In particular, such an alternative embodiment allows the force required to assemble and remove the bracelet by sliding to be increased.

The case and the system for attaching a bracelet to the case according to the invention greatly facilitate the method for producing the case, since the case is devoid of attachment horns and is entirely symmetrical. Thus, the manufacture of the case and of the bracelet can be automated. The manufacturing costs of such an assembly and of such a portable object are thus reduced, in particular due to the absence of reworking operations on the case and the absence of the need to use additional elements, such as bars, to attach the bracelet to the case.

The attachment system according to the invention advantageously dispenses with the need to use additional parts or spacers between the bracelet and the middle of the case, such as bars, or elastic clips, etc., or the need to use tools (whether specific or commonly used tools) to secure and/or remove the bracelet.

Moreover, the attachment system according to the invention simplifies the interchangeability of the bracelets, which makes it possible to easily renew a bracelet in the event of wear and tear, or to modify the aesthetics, via a simple handling operation, without the use of tools and without causing damage to one of the elements of the attachment system when removing the bracelet.

The invention has been described by way of a specific embodiment of the case and of the ends of the strands of the bracelet. However, it is clear that other embodiments, as well as those derived from that described, can be envisaged.

The invention claimed is:

1. A portable object comprising:

a case having a middle, a bracelet, and an attachment system for removably securing each end of said bracelet to the middle, the middle comprising two longitudinal cavities configured to form a slide bar, each end of the bracelet comprising a fastening head that has a complementary shape and that is configured to cooperate, by sliding, with one of the longitudinal cavities to form the attachment system, wherein said fastening head comprises an end flange made of a viscoelastic material, and wherein the attachment system comprises viscoelastic fitting means for locking an axial movement of said fastening head inside the longitudinal cavity by a viscoelastic response of the end flange, the viscoelastic fitting means being formed by a cooperation of a rigid locking protrusion, provided in each of the longitudinal cavities, and configured to deform the end flange made of the viscoelastic material upon insertion of the bracelet, said locking protrusion being configured to fit inside a recess made in the end flange made of the viscoelastic material in order to lock the axial movement of the fastening head.

2. The portable object according to claim 1, wherein the end flange made of the viscoelastic material is an end portion of the fastening heads.

3. The portable object according to claim 1, wherein the end flange made of the viscoelastic material forms the end flange.

4. The portable object according to claim 1, wherein the end flange made of the viscoelastic material is made of a thermoplastic elastomer.

5. The portable object according to claim 1, wherein the fastening head at each end of the bracelet is made of a thermoplastic elastomer.

6. The portable object according to claim 1, wherein the recess is made in a central region of the end flange made of the viscoelastic material and the locking protrusion is longitudinally centered inside the longitudinal cavity.

7. The portable object according to claim 1, wherein the bracelet has two strands, each strand comprising the fastening head forming the end of the strand, and the fastening head is formed integrally in one piece with the strand of the bracelet.

8. The portable object according to claim 1, wherein the locking protrusion is formed integrally in one piece with the middle.

9. The portable object according to claim 1, wherein the middle is made of a thermoplastic material.

10. The portable object according to claim 9, wherein the thermoplastic material is polyamide 11.

11. The portable object according to claim 1, wherein dimensions of the fastening head are greater than dimensions of the longitudinal cavity.

12. The portable object according to claim 1, wherein the attachment system is configured to allow the bracelet to be assembled and removed either via a first end or via a second end of the longitudinal cavity.

13. The portable object according to claim 1, wherein the longitudinal cavities extend over two circular segments of the middle located in 6 o'clock and 12 o'clock positions.

14. The portable object according to claim 1, wherein the portable object is a wristwatch.

15. The portable object according to claim 1, wherein each of the longitudinal cavities includes an upper surface, a lower surface, and a bottom surface extending between the upper surface and the lower surface, the lower surface being planar.

16. The portable object according to claim 15, wherein the rigid locking protrusion projects from the bottom surface of each of the longitudinal cavities.

* * * * *